United States Patent
Barna

(10) Patent No.: US 11,783,390 B2
(45) Date of Patent: Oct. 10, 2023

(54) MODEL FOR BALANCING ENERGY IN A PROSUMER ENERGY SYSTEM

(71) Applicant: Seth Michael Barna, Washington, DC (US)

(72) Inventor: Seth Michael Barna, Washington, DC (US)

(*) Notice: Subject to any disclaimer, the term of this patent is extended or adjusted under 35 U.S.C. 154(b) by 0 days.

(21) Appl. No.: 16/949,524

(22) Filed: Nov. 2, 2020

(65) Prior Publication Data

US 2021/0133832 A1    May 6, 2021

Related U.S. Application Data

(60) Provisional application No. 62/929,358, filed on Nov. 1, 2019.

(51) Int. Cl.
| | | |
|---|---|---|
| *G06Q 30/02* | (2023.01) | |
| *G06Q 30/0283* | (2023.01) | |
| *G06Q 40/02* | (2023.01) | |
| *G06Q 50/06* | (2012.01) | |

(52) U.S. Cl.
CPC ......... *G06Q 30/0283* (2013.01); *G06Q 40/02* (2013.01); *G06Q 50/06* (2013.01)

(58) Field of Classification Search
CPC ..... G06Q 30/0283; G06Q 40/02; G06Q 50/06
See application file for complete search history.

(56) References Cited

U.S. PATENT DOCUMENTS

| | | |
|---|---|---|
| 8,249,902 B2 | 8/2012 | Arfin et al. |
| 8,494,922 B2 | 7/2013 | Carlin, Jr. et al. |
| 8,645,239 B2 | 2/2014 | Swaminathan et al. |
| 8,768,799 B1 | 7/2014 | Forbes |
| 9,031,874 B2 | 5/2015 | Kremen |
| 9,671,843 B2 | 6/2017 | Ellis et al. |
| 9,835,352 B2 | 12/2017 | Devenish et al. |
| 9,977,847 B2 | 5/2018 | Dannecker et al. |
| 10,019,739 B1 | 7/2018 | Packer et al. |
| 10,410,153 B2 | 9/2019 | Fife |
| 2009/0240424 A1 | 9/2009 | Hayes-Roth |
| 2013/0046668 A1* | 2/2013 | Al Faruque ............ G06Q 50/06 705/35 |
| 2015/0339266 A1* | 11/2015 | Twaha .................... H02J 3/381 703/2 |
| 2016/0026729 A1 | 1/2016 | Gil et al. |
| 2016/0350734 A1 | 12/2016 | Samid |
| 2019/0267808 A1 | 8/2019 | Weindl et al. |
| 2019/0279313 A1 | 9/2019 | Miyamoto et al. |

FOREIGN PATENT DOCUMENTS

| | | | |
|---|---|---|---|
| JP | 2003299248 A | * 10/2003 | |
| WO | WO-2017204497 A1 | * 11/2017 | ............... H02J 3/00 |
| WO | WO-2018148732 A2 | * 8/2018 | ......... G06Q 30/0601 |

* cited by examiner

*Primary Examiner* — Raquel Alvarez
(74) *Attorney, Agent, or Firm* — Dunlap Bennett & Ludwig, PLLC

(57) ABSTRACT

A model for balancing energy loads in a prosumer energy system, wherein the method combines multiple interacting technologies, behavioral responses and real-time energy interactions to offer a better evaluation of the prosumer energy system.

8 Claims, 4 Drawing Sheets

INTERACTIVE PROSUMER MODEL

|  |  |  | KWH/MONTH | INVESTMENT |  |
|---|---|---|---|---|---|
| 10 → HOME SIZE | EFFICIENCY | 0 | 1,371 | $0 |  |
| INSULATION | 15% | 1 | -206 | $1,500 |  |
| 18 { GEO THERMAL | 30% | 0 | 0 | $0 |  |
| PASSIVE WATER | 20% | 0 | 0 | $0 |  |
| 24 → APPLIANCES | 10% | 1 | -116 | $10,000 |  |
| 22, 26 → AUTOMATION | 20% | 1 | -210 | $0 |  |
| 20 → D/C | 30% | 1 | -252 | $0 |  |
| OFF-GRID | SOLAR | 1 | -1,371 | $24,466 |  |
| 14 { DOUBLE | BARN | 0 | 0 | $0 |  |
| TRIPPLE | FIELD | 0 | 0 | $0 |  |
| SUBSIDY |  | 1 | 0 | $-7,340 |  |
| BATTERY | 40 | 1 | 1,200 | $16,800 |  |
| 2 BATTERIES | 0 | 0 | 0 | $0 |  |
| 2 BATTERIES | 0 | 0 | 0 | $0 |  |
| 16 { 2 BATTERIES | 0 | 0 | 0 | $0 |  |
| BATTERY TYPE |  | 1 | AGM | $60 | KWH |
| BATTERY LIFE |  | 1 | 15 | YRS. |  |
| PUG EV (10%) | 20 | 1 | 600 | $30,000 |  |
| CRITICAL PEAK |  | 1 | 360 |  |  |

|  |  |  |  |
|---|---|---|---|
| USAGE |  | 1,371 | $0 |
| EFFICIENCY |  | -783 | $11,500 |
| ENERGY USED |  | 587 | $0 |
| 12 { SOLAR |  | -1,371 | $17,126 |
| STORAGE BATT |  | 1,200 | $16,800 |
| EV |  | 600 | $30,000 |
| CRIT PEAK AVI |  | 360 | $0 |
| RETAIL TOTAL |  | 783 | $28,626 |
| TOU TOTAL |  | 1,213 | $75,426 |
| TOU OFF-PEAK |  | -429 | $-21 /MONTH |

FIG.2

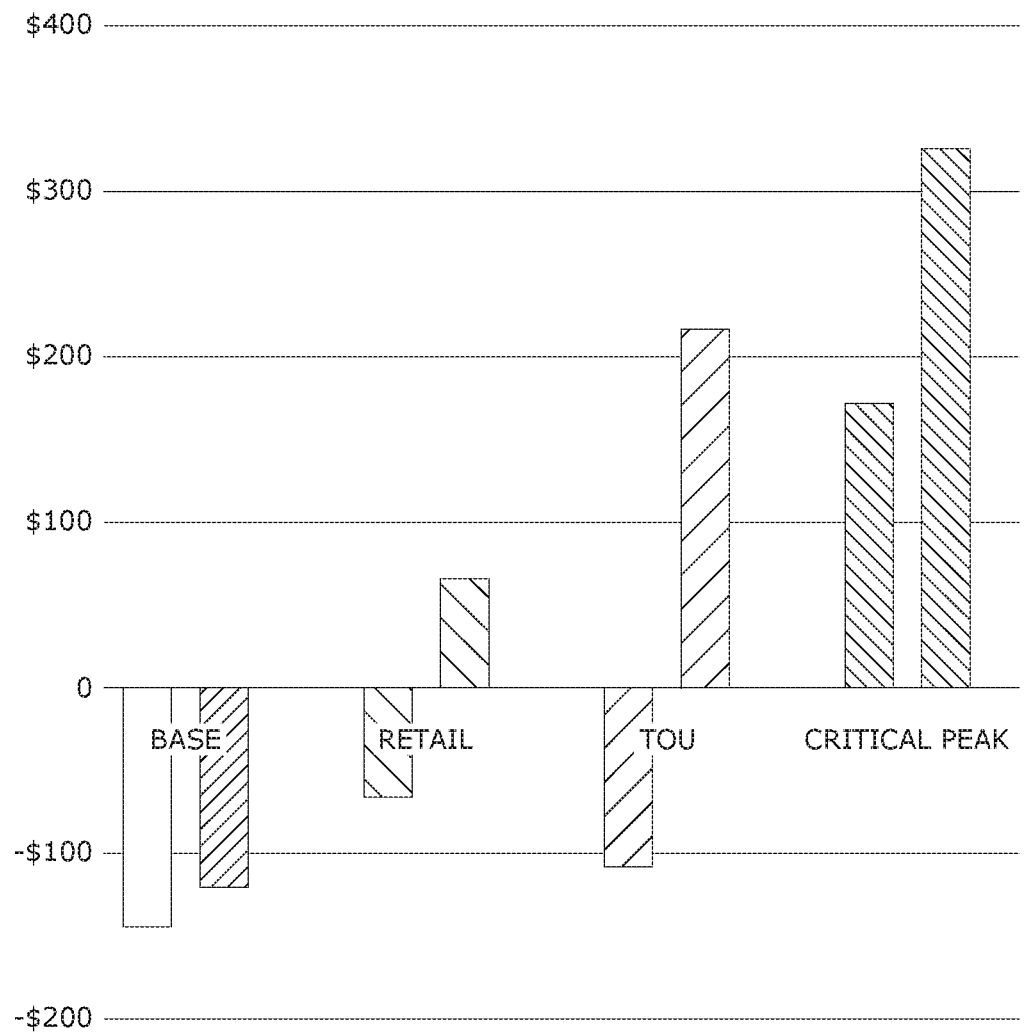

MODEL FOR BALANCING ENERGY IN A PROSUMER ENERGY SYSTEM

CROSS-REFERENCE TO RELATED APPLICATION

This application claims the benefit of priority of U.S. provisional application No. 62/929,358, filed 1 Nov. 2019, the contents of which are herein incorporated by reference.

BACKGROUND OF THE INVENTION

The present invention relates to prosumer energy systems and, more particularly, a model for balancing energy loads in a prosumer energy system.

With every passing day, as more individuals generate their own power from distributed energy resources, electricity consumption is becoming more and more a two-way street. For instance, through their own rooftop solar panels an individual finds themselves having excess energy they can sell back two-way energy distribution system (the smart grid). Because individuals like this are both a producer and a consumer of electricity, they are called prosumers, and they are a growing presence in the energy space.

Solar energy prosumers, therefore, need to understand and identify the mix of interacting technologies necessary to design an effective energy system. Prosumers also need to understand how their exported energy will interact with the smart grid. Technology providers and policy makers also need to demonstrate the benefits of energy technology in the context of a prosumer energy system. Accordingly, prosumers need a method or model to evaluate energy technologies within a prosumer system.

By failing to combine multiple interacting technologies, behavioral responses and real-time energy interactions, existing models do not adequately characterize or evaluate the energy technology options available in a prosumer energy market. Put another way, since the existing models do not demonstrate the technology interactions, behavior responses and energy sales options, they do not allow prosumers to effectively evaluate or understand the best technology options in which to invest their money.

As can be seen, there is a need for a model for balancing energy loads in a prosumer energy system. The present invention combines multiple interacting technologies, behavioral responses (such as a price signal response) and real-time energy interactions (such as dynamic energy rates) to offer a better evaluation of prosumer energy systems, whereby evaluations of existing prosumer systems or development of new prosumer systems are afforded a more informative selection of the optimal technologies when assessing or designing a prosumer system. As a corollary, the present invention will also help policy makers to understand prosumer energy systems and assist energy technology providers demonstrate their technology within a prosumer system.

The model embodied in the present invention allows prosumers to select among technologies through characterizations of the technological interactions, behaviors responses, and grid interactions. The model is designed to help potential prosumers to observe the outcomes of the selected technology. The model of the present invention also demonstrates the effectiveness of a technology within a prosumer energy system.

SUMMARY OF THE INVENTION

In one aspect of the present invention, a computer implemented method for evaluating a microgrid for coupling to a smart grid, the method including the following: collecting, by way of a server, energy data from the smart grid; receiving, by way of the server, usage data for a plurality of microgrid technologies; selecting or deselecting, by way of the server, one or more of the plurality of microgrid technologies to be added to a permutation of the microgrid; providing, by way of the server, a behavioral response module to define behavioral response data for each permutation resulting from each selection or deselection; and providing, by way of the server, an analytics module receiving the behavioral response data from the behavioral response module and the energy data from the smart grid, performing real-time analytics using the behavioral response data and energy data received from the smart grid from the smart grid, and providing analytical results demonstrating an energy balance for each permutation, wherein the usage data comprises at least one battery capacity, wherein the usage data comprises at least one efficiency rating, wherein the usage data comprises at least one solar system cost, wherein the behavioral response data comprises at least one behavioral response, wherein the behavioral response data comprises at least one energy sales option, wherein the energy balance is a function of a load balance, wherein the energy balance is a function of a loan amount for one or more the plurality of microgrid technologies, wherein the energy balance is a function of an interest rate for said loan amount.

These and other features, aspects and advantages of the present invention will become better understood with reference to the following drawings, description and claims.

BRIEF DESCRIPTION OF THE DRAWINGS

FIG. 2 is a diagrammatic view of an exemplary embodiment of an interactive prosumer model interface of the present invention;

FIG. 3 is a continuation of the diagrammatic view of FIG. 2; and

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a model for balancing energy loads in a prosumer energy system, wherein the method combines multiple interacting technologies, behavioral responses and real-time energy interactions to offer a better evaluation of the prosumer energy system.

Figure 1:
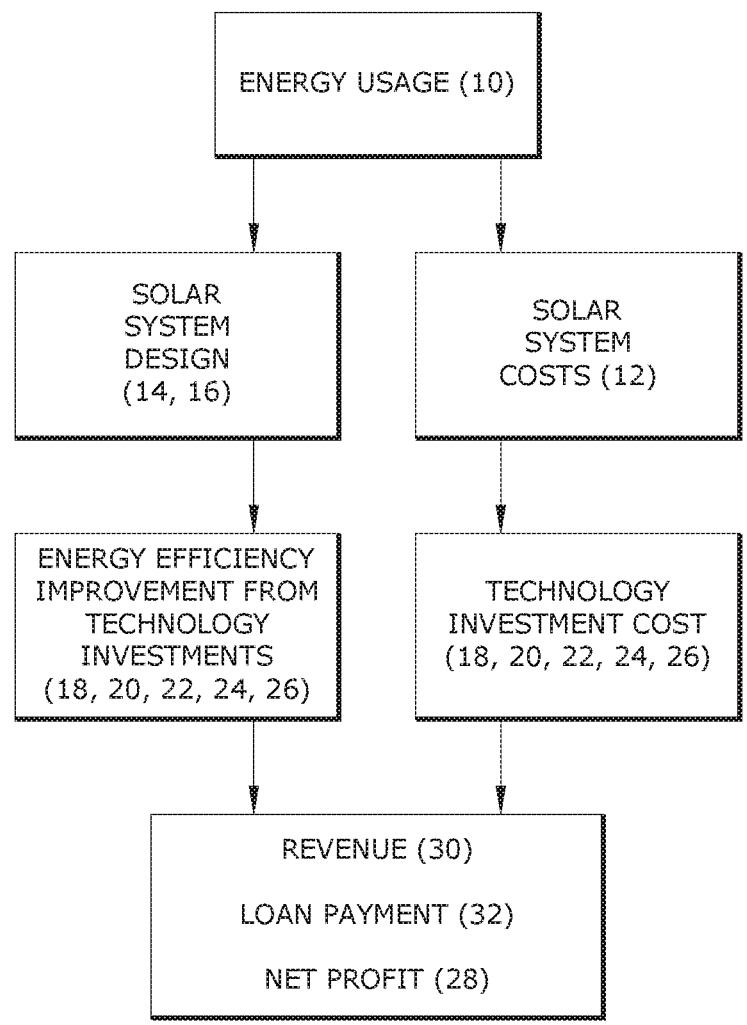
FIG. 1 is a diagrammatic view of an exemplary embodiment of a prosumer energy system model function of the present invention.
Figure 4:
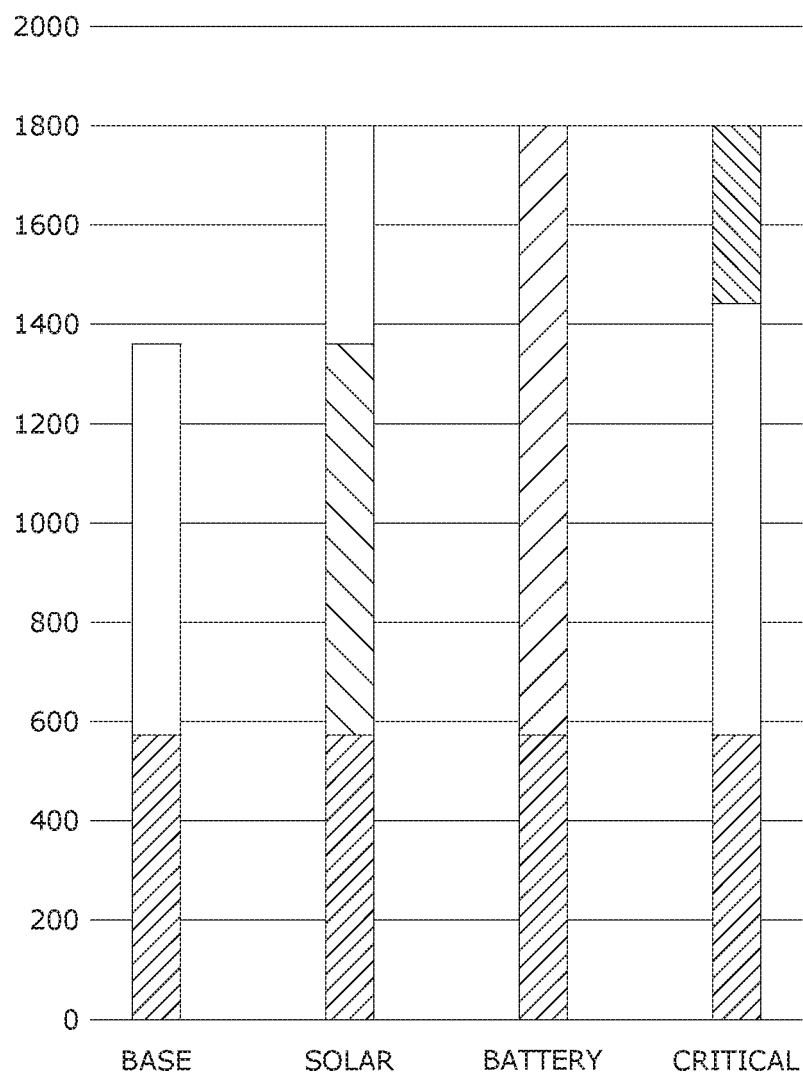
FIG. 4 is a continuation of the diagrammatic view of FIG. 3.

Referring to FIGS. 1A and 1B, the model for balancing energy loads in an prosumer energy system may include the following systemic components: Energy Usage 10 (energy usage before the system); Solar System Cost 12 (cost of solar panels and installation); Solar Panel Capacity 14 (solar panel installation amount); Battery Capacity 16 (type and amount of energy storage—this is the maximum amount of energy stored for load shift sales, this impacts the system cost); Structure Efficiency Upgrades 18 (such as insulation, reduces the energy usage, and adds to system cost); Direct Current Conversion 20 (efficiency improvements from direct current reduce energy usage, impacts system cost); Smart Meter Control 22 (efficiency improvements from automated system control for reducing energy usage); Appliance Conversion 24 (includes efficiency improvements from appliance upgrades, reduces energy usage, impacts system cost); Behavioral Response 26 (behavioral response to energy use information reduces energy usage) Energy Sales Options 28 (net, real-time and critical peak energy prices, returns on system cost investments); Interest Rates 30 (investment amount and interest rate); and Loan Period 32 (duration of loan for investments).

The model characterizes energy technology and behavior interactions to show the energy balance of the energy system. The model shows the amount of energy used, energy saved and energy available for export. The model includes several technologies; solar panels, batteries, structural efficiency upgrades, DC conversion, smart meters, and energy efficient appliances. This model allows the users to select among the technologies to test different system scenarios to develop a prosumer system with the desired energy balance. The model characterizes the interactive benefits of the technologies selected to apply a reduction to the energy used. The model tallies the total investment necessary for the selected energy technologies. These investments are evaluated using an interest rate and loan duration. The model allows users to select from energy sales options, fixed rate, real-time, and critical peak pricing. When selected, the rates are applied to the energy exported. The model reconciles the technology investments and energy sales to evaluate the financial balance of the system.

The present invention is created using mathematical and graphical display software for the mathematical and graphical characterization of the technologies and their interactions and costs. The present invention also mathematically characterizes behavioral responses and grid interactions. The present invention requires a suite of technology options to be evaluated. The present invention can be improved by adding and updating technology options, behavioral responses, and grid interactions as they change or are better understood. The present invention components can be shuffled, interchanged or reconfigured to yield similar results. Adding and updating technology options, behavioral responses, and grid interactions as they change or are better understood is part of the flexibility of the model design.

A method of using the present invention may include the following. The model for balancing energy loads in a prosumer energy system disclosed above may be provided. A prosumer or potential prosumer can use the model to select among technologies within the context of the prosumer energy system. Technology companies can use the model to demonstrate their technology within a prosumer system. Policy makers, teachers, prosumers and technology companies can also use the model to demonstrate the concepts necessary for developing effective prosumer systems.

Additionally, the model can be used in conjunction with other models to calculate the impact of individual prosumers on the grid. In other words, the model can be used to apply the micro energy system within the macro energy system.

Also, the model embodied by the present invention can be used to characterize energy exports to existing systems. These characterizations can be used to predict or forecast the prosumer impact on the electric grid. These characterizations can be used for grid services such as energy aggregations, peak shaving, ducking periods and load balancing.

In certain embodiments, the network may refer to any interconnecting system capable of transmitting audio, video, signals, data, messages, or any combination of the preceding. The network may include all or a portion of a public switched telephone network (PSTN), regional transmission organization (RTO), independent system operator (ISO), transmission system operator (TSO), distribution system operator (DSO), energy aggregator, local grid operator, smart grid, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, the computing systems may be a web server running web server applications such as Apache, Microsoft's Internet Information Server™, and the like.

In particular embodiments, the computing systems includes a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for communication between a person and the computer systems. As an example and not by way of limitation, an user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface and any suitable user interfaces for them.

The communication interface includes hardware, software, or both providing one or more interfaces for communication (e.g., packet-based communication) between the computing systems over the network. As an example and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example and not by way of limitation, the computing systems may communicate with an ad hoc network, blockchain network, peer to peer network (P2P), a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A system for predictively evaluating a suite of technology options prior to installing the suite of technology options in a prosumer home or facility for coupling to an energy grid, a smart grid, or a microgrid, the system comprising:

the energy grid, the smart grid, or the microgrid, electrically coupled to one or more smart meters connected to a server;

the server configured for the following:
collecting, by way of the server, energy data, via the one or more smart meters, from the smart grid; and
selecting or deselecting, by way of a computer coupled to the server, one or more of the suite of technologies to be added to a prospective permutation of the prosumer home or facility prior to installing the suite of technology options;

each suite of technologies comprises a plurality of technologies, wherein each technology comprises financing data and usage data, and wherein each usage data includes at least one of a group consisting of an energy usage amount, and an energy production amount, an energy storage amount, and an energy reduction amount;

the server running a behavioral response module to define energy balance data for each permutation resulting from each selection or deselection of each technology option, wherein the energy balance data defines a total energy usage amount, a total energy production amount, a total energy storage amount, and wherein the total energy usage amount is a product of the energy usage amount and the energy reduction amount;

the server running an analytics module receiving the energy balance data from the behavioral response module, the financing data via the computer, and the energy data from the smart grid; and in response to each selection or deselection from the server by way of the computer, the server performing real-time analytics using the energy balance data, the financing data, and said energy data, and providing, on a user interface of the computer, analytical results demonstrating an energy balance for each permutation, wherein the energy balance comprises graphical distinctions between each selected technology option.

2. The system of claim 1, wherein the energy data comprises an energy rate for the smart grid.

3. The system of claim 2, wherein the usage data comprises at least one of a production change, a storage capacity maximum, and a usage change for the prospective permutation for each selected technology.

4. The system of claim 3, wherein the financing data comprises at least one energy sales option response.

5. The system of claim 4, wherein the financing data is a function of a load balance.

6. The system of claim 5, wherein the financing data is a function of a loan amount for each selected technology.

7. The system of claim 6, wherein the financing data is a function of an interest rate for said loan amount.

8. The method of claim 7, wherein one of the technologies is a direct current conversion.

\* \* \* \* \*